United States Patent [19]

Whitehead

[11] Patent Number: 4,850,665
[45] Date of Patent: Jul. 25, 1989

[54] METHOD AND APPARATUS FOR CONTROLLED EMISSION OF LIGHT FROM PRISM LIGHT GUIDE

[75] Inventor: Lorne A. Whitehead, Vancouver, Canada

[73] Assignee: Minnesota Mining and Manufacturing Company, St. Paul, Minn.

[21] Appl. No.: 17,057

[22] Filed: Feb. 20, 1987

[51] Int. Cl.$^4$ .............................................. G02B 6/00
[52] U.S. Cl. .............................. 350/96.10; 350/96.28; 362/308
[58] Field of Search ....................... 362/308, 309, 336; 350/96.10, 96.28

[56] References Cited

U.S. PATENT DOCUMENTS

| 4,260,220 | 4/1981 | Whitehead | 350/96.28 |
| 4,510,560 | 4/1985 | Negishi | 362/308 X |
| 4,539,625 | 9/1985 | Bornstein et al. | 362/308 X |
| 4,576,436 | 3/1986 | Daniel | 350/96.1 |
| 4,678,279 | 7/1987 | Mori | 350/96.1 X |
| 4,690,490 | 9/1987 | Mori | 350/96.15 |
| 4,740,048 | 4/1988 | Mori | 350/96.15 |

Primary Examiner—John D. Lee
Attorney, Agent, or Firm—Donald M. Sell; Walter N. Kirn; Stephen W. Buckingham

[57] ABSTRACT

Method and apparatus for reflecting light constrained to travel within a prism light guide such that the reflected light is refracted by and escapes through a selected portion of the light guide wall at a selected angular orientation with respect to the guide.

7 Claims, 6 Drawing Sheets

METHOD AND APPARATUS FOR CONTROLLED EMISSION OF LIGHT FROM PRISM LIGHT GUIDE

TECHNICAL FIELD

This application pertains to a method and apparatus for controlling the angular orientation of light reflected from a selected region within a Prism Light Guide as described and illustrated in U.S. Pat. No. 4,260,220 issued Apr. 7, 1981 for an invention of Lorne A. Whitehead.

BACKGROUND ART

The aforementioned U.S. patent describes and illustrates a Prism Light Guide for transmitting or "piping" light from a central source to a remote location or locations. As used herein the term "light guide" means a light guide as described and claimed in the aforementioned U.S. patent. More particularly, the term "light guide" as used herein means a hollow structure comprised of sections having substantially planar inner and outer surfaces which are in "octature" in that each section satisfies all of the following conditions:
1. All of the inner surfaces of each section are either perpendicular or parallel to one another;
2. All of the outer surfaces of each section are either perpendicular or parallel to one another; and,
3. Each of the inner surfaces is at a 45° angle to each of the outer surfaces.

As explained in the aforementioned patent, light may be constrained to travel through such a light guide without escaping through the walls of the guide if the angle by which the light rays deviate from the longitudinal axis vector of the guide does not exceed a maximum angle which depends upon the refractive index of the light guide material and which can be shown to be 27.6° for light guide material such as acrylic plastic having a refractive index of 1.5.

In many applications it is desirable that light escape from the light guide at selected regions along the guide, rather than simply being directed to the end of the guide or being allowed to escape continually along the length of a given surface of the guide. It is also desirable that light escape from the guide at a selected angular orientation with respect to the guide so as to achieve the optimum coefficient of utilization with minimum glare for interior lighting applications. In many cases it is particularly desirable that light escape from the guide at an angle of 90° with respect to the internal planar surface of the guide section through which the escaping light is refracted. It is also desirable that the aforementioned objectives be attained with minimal attenuation or absorption of light by whatever means may be used to facilitate the escape of light from the guide at a particular selected region or regions so that light which does not escape from the guide at a particular region continues to travel along the guide to provide illumination when its escape from the guide is facilitated by further means located at another region or regions along the guide.

One way of achieving the foregoing objectives is to locate a light reflecting element such as a mirror in one of the light guide walls or within the hollow space inside the light guide. Such elements could be oriented to reflect a portion of the light within the guide (presumed to be formed of a material having a refractive index of 1.5) at an angle (measured between a vector which characterizes the light path and the longitudinal axis vector of the guide) in excess of 27.6°, thereby allowing the reflected light portion to escape by refraction through the wall of the guide as explained in the aforementioned patent. However, there are several disadvantages to this approach. First, since the reflected light may escape through any of the four light guide walls an external cover must be provided around those light guide wall sections through which it is desired to prevent light escapement. The cover reflects light which escapes through the light guide walls adjacent the cover back through the light guide walls for eventual direction of the light to the uncovered light guide wall section through which it may escape so as to provide illumination along the uncovered section of the light guide surface. A filter may be provided over the uncovered light guide section through which light is allowed to escape to give the escaping light a desired angular orientation with respect to the light guide surface through which it escapes.

However, the foregoing technique has some significant shortcomings. In practice, it is rarely possible to avoid absorption of less than about 25% of the incident light by the light reflecting element and/or reflective light guide cover. Furthermore, although filtration as aforesaid facilitates some control of the angular orientation of light escaping from the light guide, the extent of such control is quite limited. As previously indicated it is often desirable that light escaping from the light guide be oriented in a relatively narrow range of angles which are approximately perpendicular to the internal (planar) surface of the light guide section through which the escaping light is refracted, which is not possible with state of the art filtration techniques and materials.

The present invention facilitates precise control of the angular orientation, relative to the light guide, of light reflected from a selected region inside a light guide and refracted by the guide to a region outside the guide. This is accomplished with the aid of light reflecting elements which are precisely located within the light guide so as to (1) enable a certain fraction of the light to pass unattenuated for processing at further region(s) along the light guide; and, (2) reflect the rest of the light toward a selected light guide wall section such that, when refracted through the wall, the light escapes from the guide at a selected angular orientation with respect to the guide.

DISCLOSURE OF INVENTION

In a broad aspect, the invention provides a method for reflecting a portion of the light constrained to travel within a light guide such that the reflected light portion escapes through a selected section of the light guide at a selected angular orientation with respect to the guide. The method comprises the steps of locating a light reflecting element within the guide and orienting the element to reflect a portion of the light constrained to travel within the guide at an angle, relative to the longitudinal axis vector of the guide, which exceeds the maximum angle at which light remains constrained to travel within the guide, and which further results in escapement of the reflected light portion at the selected angular orientation when it is refracted through the selected guide portion.

The reflected light path inside the guide is characterized by a vector $I_{in}$. The refracted light path outside the guide is characterized by a vector $I_{out}$. The orientation of the light reflecting element is characterized by a vector $I_m$, which is perpendicular to and directed out of the reflective surface of the light reflecting element.

The vector $I_{in}$ has an angular orientation defined by:

(a) an angle $\theta_{in}$ measured between the vector $I_{in}$ and the longitudinal axis vector of the guide; and, (b) an angle $\phi_{in}$ measured between:
  (i) a plane which contains the vector $I_{in}$ and which also contains the longitudinal axis vector of the guide; and,
  (ii) a line perpendicular to the selected internal light guide surface through which the light is refracted.

The vector $I_{out}$ has an angular orientation defined by:

(c) an angle $\theta_{out}$ measured between the vector $I_{out}$ and the longitudinal axis vector of the guide; and, (d) an angle $\phi_{out}$ measured between:
  (i) a plane which contains the vector $I_{out}$ and which also contains the longitudinal axis vector of the guide; and,
  (ii) a line perpendicular to the selected internal light guide surface through which the light is refracted.

The method comprises locating a light reflecting element within the guide at an angular orientation defined by:

(e) an angle $\theta_m$ measured between the longitudinal axis vector of the guide and a vector $I_m$ perpendicular to and directed out of the reflective surface of the reflecting element; and, (f) an angle $\phi_m$ measured between:
  (i) a plane which contains the vector $I_m$ and which also contains the longitudinal axis vector of the guide; and,
  (ii) a line perpendicular to the selected internal light guide surface through which the light is refracted.

The light reflecting element is located such that:

$$\theta_m = (180° + \theta_{out})/2;$$

$$\phi_m = \phi_{in};$$

$$\theta_{in} = \theta_{out}; \text{ and,}$$

$$\phi_{in} = \sin^{-1}(n'\sin((\sin^{-1}(1/n \sin(\phi_{out} \pm 45°)))\mp 45°));$$

where $$n' = n((1-\cos^2\theta_{out}/n^2)/(1-\cos^2\theta_{out}))^{\frac{1}{2}};$$

and n is the refractice index of light guide material.

The reflecting element may be a mirror, a prismatic reflective or refractive element, or any reflective or refractive element which redirects light so that it is caused to escape from the light guide in accordance with the foregoing relationships, although in practice the reflecting element is preferably a dielectric material (such as acrylic plastic) having a pair of parallel opposed planar surfaces. The surface area and shape of the light reflecting element may be selected with consideration given to the internal cross-sectional shape of the light guide and the angular orientation of the element within the guide such that the element occupies a selected portion of the internal cross-sectional area of the guide, thereby causing the desired fraction of light to be reflected by the element with the remainder of the light passing further along the guide.

In a particularly preferred embodiment the refractive index of the light guide material is 1.5, $\phi_{in} = \pm 25.8°$ and $\theta_n = 135°$. In another particularly preferred embodiment the refractive index of the light guide material is 1.5 and the light reflecting element comprises first and second light reflecting portions. The element is located within the guide such that $\phi_{in}$ is 25.8° for the first portion, and such that $\phi_{in}$ for the second portion is $-25.8°$ and such that $\theta_m$ for the first and second portions is 135°.

Advantageously, a plurality of light reflecting elements may be located in the light guide at selected regions within the guide so that light is reflected from each such region for refraction by the guide to a region outside the guide at a selected angular orientation with respect to the guide. Further advantage may be obtained by varying the reflectivity of the light reflecting elements such that elements which are close to the light guide light source are less reflective than elements which are further away from the light source, thereby equalizing the light output at each region.

DETAILED DESCRIPTION

Figure 1:
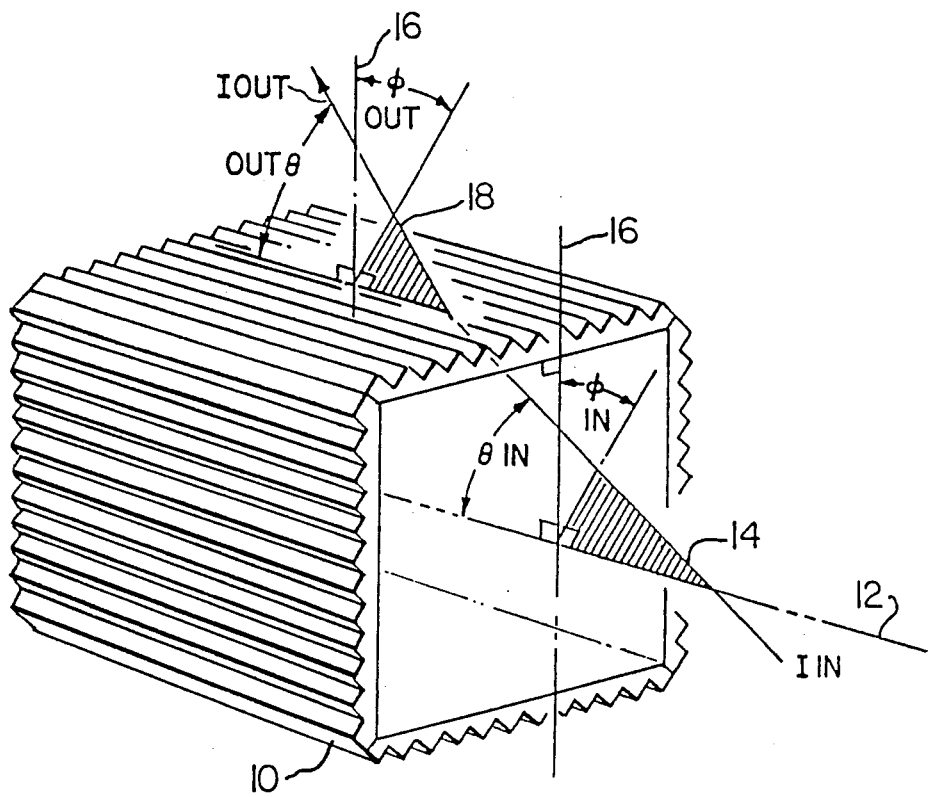
FIG. 1 is a pictorial representation of a light guide section within which an arbitrary light ray is reflected for refraction through the light guide into the region outside the guide.

In accordance with the invention a light reflecting element is located within a light guide such that light which is constrained to travel through the light guide and which encounters the element either passes through (or around) the element for further processing at other locations along the guide, or is efficiently and precisely reflected toward a selected section of the light guide wall at an angle, relative to the longitudinal axis vector of the light guide, which enables the selected wall section to refract the light so that it escapes through the selected wall section at a selected angular orientation with respect to the light guide. Preferably, this orientation is perpendicular to the internal planar surface of the selected light guide wall section through which the light ray is refracted.

The light reflecting element may be a mirror precisely located within the light guide in the manner hereinafter explained and which is of a size which will reflect only a portion of the light emanating from the light guide light source. Alternatively, the light reflecting element may be a dielectric material having a pair of parallel, opposed planar surfaces. As a further alternative, the light reflecting element may be a prismatic reflective or refractive material (in which case the relationships involving the angles $\phi_{in}$, $\phi_{out}$, $\phi_{in}$ do not change, although the definition of the orientation of the reflecting element becomes more complex since the geometry of a prismatic element is more complex than that of the planar elements hereinafter described). Indeed, the light reflecting element may be any reflective or refractive material capable of redirecting light so that it escapes through a selected section of the light guide in accordance with the relationships hereinafter set forth.

Preferably, the light reflecting element is formed of a dielectric material such as acrylic plastic. Dielectric materials are preferred for their partial surface reflectivity characteristics which facilitate transmission of approximately 92% of the incident light through the dielectric material while essentially all of the remaining incident light is reflected by the material. Accordingly, the efficiency attainable with dielectric material is very high compared with that attainable with mirrors which are comparatively absorptive. Such light transmissive dielectric materials facilitate reflection of a relatively small portion of the incident light from a relatively large surface area, thereby lowering the luminance of the escaping light. Thus, in addition to enhancing the efficiency of light transmission/reflection and facilitating control over the directionality (i.e., selection of the light guide wall section through which the light escapes) and angular orientation of the escaping light, such materials also facilitate greater control over the region from which light is emitted through the light guide wall and variation of the brightness of the emitted light as a function of the position along the light guide at which the light is emitted.

The orientation of a light reflecting element located within a light guide can be defined in terms of the direction of the vector $I_m$ which is normal to the surface of the reflecting element. One must then consider the relationship between three vectors:

(1) the direction vector $I_n$ for the light ray which is to escape through a selected section of the light guide and at a selected angular orientation with respect to the guide;

(2) the corresponding direction vector $I_{out}$ for a light ray which has been reflected by the light reflecting element toward the wall of the light guide through which it is to be refracted; and, (3) the corresponding direction vector $I_m$ for the normal to the planar surface of the reflecting element.

Figure 2:
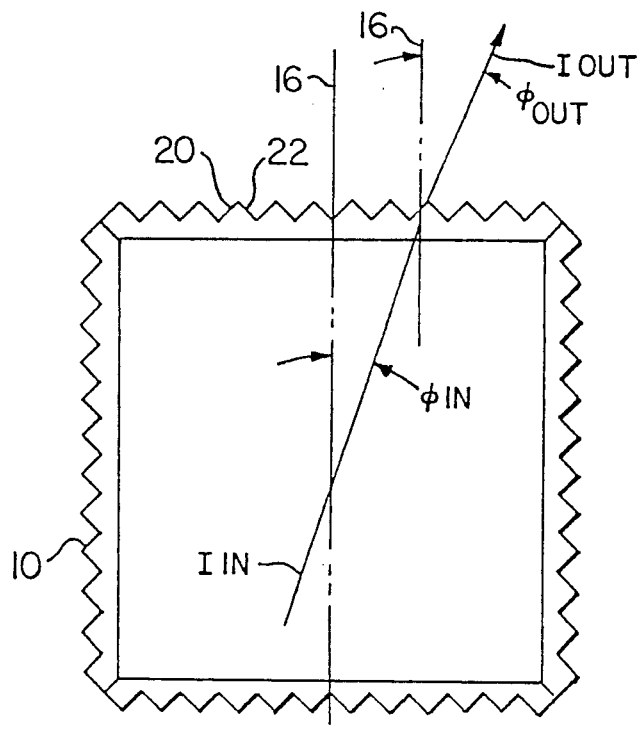
FIG. 2 is an end view of the light guide section of FIG. 1.

The most convenient coordinate system (from the point of view of simplification of the mathematics) is that shown in FIGS. 1 and 2. As shown in FIGS. 1 and 2, $I_{in}$ is a direction vector which characterizes the path traversed within prism light guide 10 by light which has been reflected by a light reflecting element positioned within light guide 10 (the light reflecting element is not shown in FIGS. 1 or 2 but is located off the drawing to the right along longitudinal axis vector 12 of light guide 10). Light traversing the path characterized by vector $I_{in}$ encounters the upper surface of light guide 10 and is refracted through that surface to escape from light guide 10 along a path characterized by direction vector $I_{out}$. Direction vector $I_{in}$ has an angular orientation defined by:

(a) an angle $\theta_{in}$ measured between vector $I_{in}$ and longitudinal axis vector 12 of light guide 10; and, (b) an angle $\phi_{in}$ measured between:
   (i) a plane 14 which contains vector $I_{in}$ and which also contains longitudinal axis vector 12; and,
   (ii) a line 16 perpendicular to the selected internal planar light guide surface through which the light is refracted.

Similarly, vector $I_{out}$ has an angular orientation defined by:

(c) an angle $\theta_{out}$ measured between vector $I_{out}$ and longitudinal axis vector 12; and, (d) an angle $\phi_{out}$ measured between:
   (i) a plane 18 which contains vector $I_{out}$ and which also contains longitudinal axis vector 12; and,
   (ii) line 16 perpendicular to the selected internal planar light guide surface through which the light is refracted.

The angular orientation of a light reflecting element located within light guide 10 to reflect light along a path characterized by direction vector $I_{in}$ for refraction by light guide 10 and escapement from guide 10 along a path characterized by direction vector $I_{out}$ may be defined by:

(e) an angle $\theta_m$ (not shown) measured between longitudinal axis vector 12 and a vector $I_m$ (not shown) perpendicular to and directed out of the reflective surface of the planar light reflecting element; and, (f) an angle $\phi_m$ (not shown) measured between:
   (i) a plane which contains vector $I_m$ and which also contains longitudinal axis vector 12; and,
   (ii) a line perpendicular to the selected internal planar light guide surface through which the light is refracted.

Simple geometric considerations and the reflection characteristics of planar reflectors reveals that:

$$\theta_m = (180° + \theta_{out})/2 \tag{1}$$

and that:

$$\phi_m = \phi_{in}. \tag{2}$$

For cylindrically symmetrical structures such as light guide 10 the effects of refraction in a three dimensional situation as illustrated may be solved with the aid of a two dimensional analogy in which the refractive light guide material has an effective refractive index which is enhanced by the fact that light travels through light guide 10 in the direction of longitudinal axis vector 12 (see: "Simplified Ray Tracing in Cylindrical Systems" by Lorne A. Whitehead, Applied Optics, 21, p. 3536–3538, 1982). Utilizing this approach and Snell's Law, it can readily be verified that:

$$\theta_{in} = \theta_{out} \tag{3}$$

$$\phi_{in} = \sin^{-1}(n'\sin((\sin^{-1}(1/n \sin(\phi_{out} \pm 45°))) \mp 45°)) \tag{4}$$

where:

$$n' = n((1 - \cos^2\theta_{out}/n^2)/(1 - \cos^2\theta_{out}))^{\frac{1}{2}} \tag{5}$$

and where n is the refractive index of the material used to construct light guide 10.

Note that there are two possible solutions to equation (4) above. This is because light refracted through the upper surface of light guide 10 may emerge through either one of the symmetrically repeated pairs of right angled facets 20, 22 which shifts the direction of vector $I_{out}$, by ±45° depending upon which of the two facets the emerging ray passes through.

Figure 3:
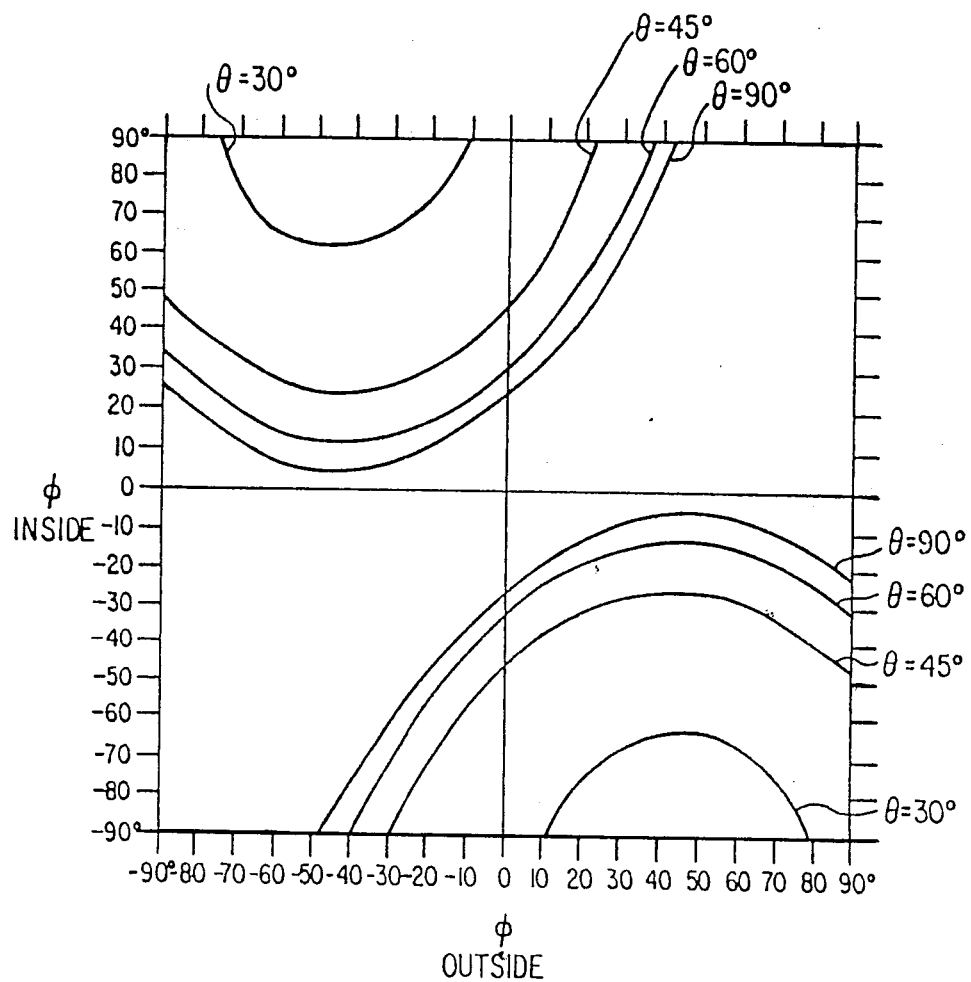
FIG. 3 is a graph in which the angle $\phi_{in}$ is plotted as the ordinate versus the angle $\phi_{out}$ as the abscissa for various values of $\theta_{out}$.

FIG. 3 is a graph in which the angle $\phi_{in}$ is plotted as the ordinate versus the angle $\phi_{out}$ as the abscissa for various values of $\theta_{out}$ and assuming that the material used to construct light guide 10 has a refractive index of 1.5 (as does acrylic plastic). FIG. 3 shows that there are many values of $\phi_{out}$ for which there are two different solutions for $\phi_{in}$, as predicted by equation (4) above.

In practice it will usually be desirable to locate the light reflecting element within light guide 10 such that light escapes from light guide 10 along a direction vector $I_{out}$ which is perpendicular to the internal planar surface of light guide 10 through which the light is refracted. That is, the angular orientation of direction vector $I_{out}$ will be such that $\theta_{out} = 90°$ and $\phi_{out} = 0°$. As may be seen by solving the above equations, this corresponds to an angle $\phi_{in} = \pm 25.8°$ and an angle $\theta_{in} = 90°$ which in turn corresponds to an angle $\theta_m = 135°$. In other words, the vector which is normal to the planar surface of the light reflecting element located within light guide 10 faces toward the direction along which light is propagated through light guide 10 and is 45° off axis in that direction.

The actual dimensions of a particular light reflecting element may be selected, relative to the internal cross-sectional area of light guide 10 (i.e., the rectangular area shown in FIG. 2), and relative to the angular orientation of the light reflecting element within light guide 10, such that the element will occupy a selected portion of the internal cross-sectional area of light guide 10. The shape of the light reflecting element may then be determined by routine vector algebra which need not be presented here. Those skilled in the art will however understand that by selectably altering the dimensions and/or shape of the light reflecting element as aforesaid one may allow a given quantity of light to pass along light guide 10 unaffected by the light reflecting element, with the remaining light reflected by the light reflecting element for refraction by and escape through a selected wall section of guide 10, while ensuring that the light reflecting element is shaped to fit neatly within light guide 10.

Figure 5:
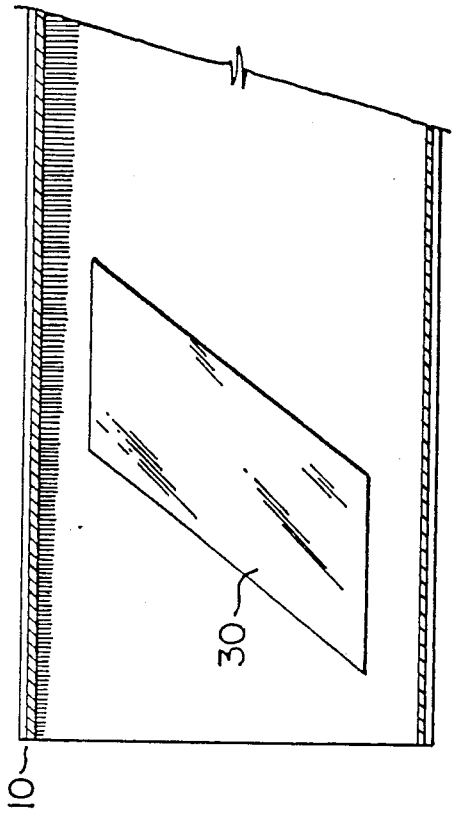
FIG. 5 is a cross-sectional side view of the light guide section and element of FIG. 4.
Figure 4:
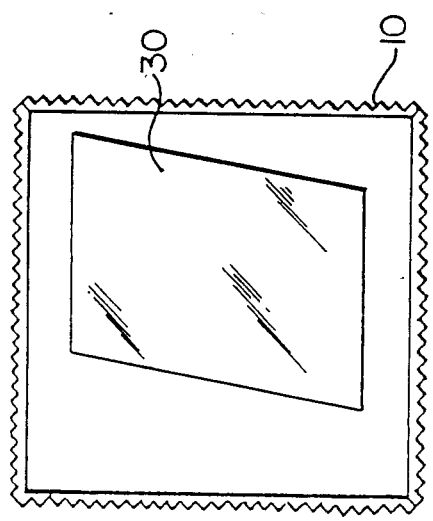
FIG. 4 is an end view of the light guide section of FIG. 1 within which a light reflecting element is positioned in accordance with the invention.
Figure 6:
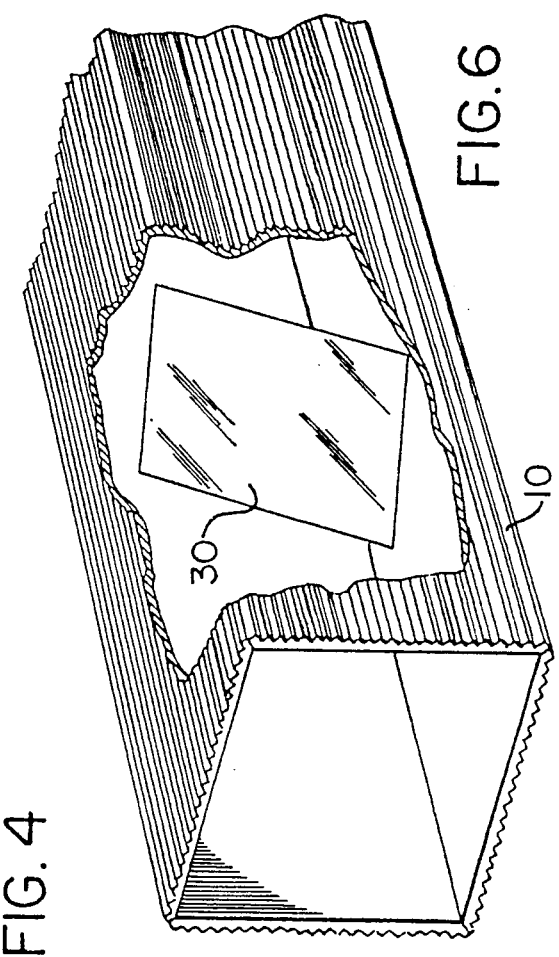
FIG. 6 is a partially fragmented pictorial view of the light guide section and element of FIGS. 4 and 5.

FIGS. 4, 5 and 6 illustrate, respectively, end, cross-sectional side and partially fragmented pictorial views of a light guide 10 within which a light reflecting element 30 is located in accordance with the invention to allow part of the light constrained to travel through light guide 10 to pass unaffected by element 30 while the remaining light is reflected by element 30 toward a selected section of one of the internal surfaces of light guide 10 for refraction through that surface section to escape therethrough at a desired angular orientation with respect to light guide 10.

Figure 7:
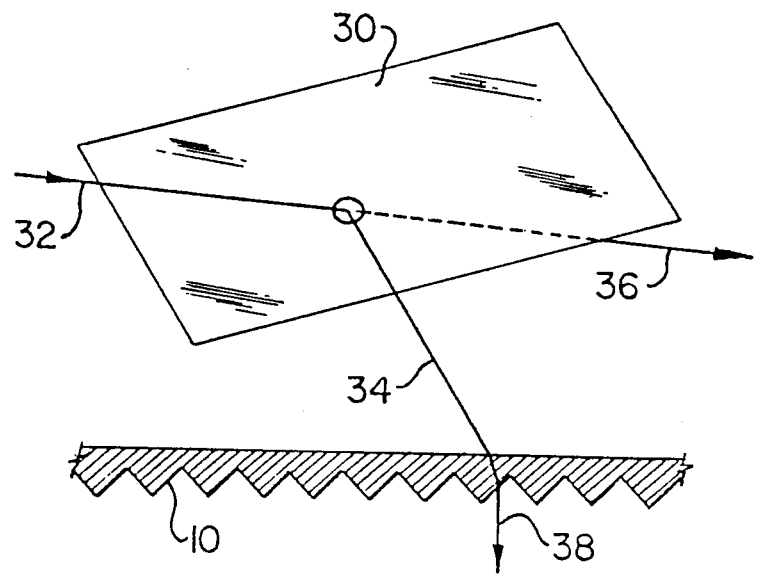
FIG. 7 is a diagramatic representation of the manner in which light is partially reflected by and partially transmitted through the light reflecting element of FIGS. 4 through 6 and of the manner in which the light reflected by the element is refracted by the light guide wall and escapes therethrough, at 90° to the internal surface of the light guide wall, in accordance with a preferred embodiment of the invention.

FIG. 7 illustrates the manner in which light constrained to travel within guide 10 may be partially reflected by and partially transmitted through element 30 for refraction of the reflected light portion by a selected section of guide 10 at an angle of 90° to the internal planar surface of guide 10. As may be seen, incident light ray 32 strikes element 30 which is located within guide 10 and oriented to partially reflect light ray 32 along path 34 toward a selected section of the internal planar surface of light guide 10 at an angle which deviates from the longitudinal axis vector of guide 10 by more than 27.6°, thereby ensuring that reflected ray 34 will be refracted through the wall of light guide 10 and escape therefrom, rather than remain constrained to travel within light guide 10 (which would be the case if reflecting element 30 were not present). Since reflecting element 30 is a dielectric material the portion of incident ray 32 which is not reflected by element 30 is transmitted through element 30 along path 36 with very little absorptive loss and remains constrained to travel within guide 10. Reflected ray 34 is refracted through the wall of light guide 10 to escape therefrom along path 38 at an angular orientation which may be precisely controlled, relative to light guide 10, through selective location of element 30 within light guide 10 according to the relationships described above, so that the escaping light has the preferred perpendicular orientation to the internal planar surface of light guide 10.

Figure 8:
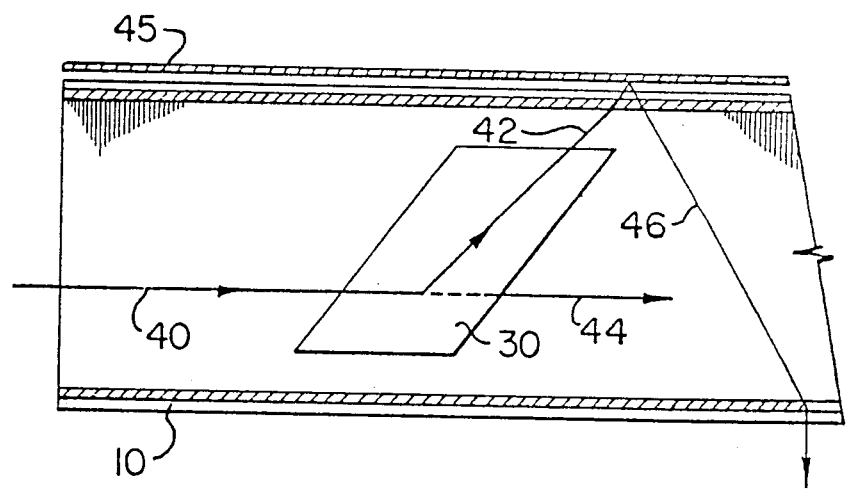
FIG. 8 is a diagramatic representation of the manner in which a light ray which has passed through the light guide and has been reflected off a terminal mirror at the end of the light guide may be reflected by and transmitted through the light reflecting element of FIGS. 4 through 6 for eventual refraction by and escapement through a selected portion of the light guide wall and at a selected angular orientation with respect thereto.

FIG. 8 is a cross-sectional side view of a light guide 10 through which light is propagated from a light source which is not shown but which is located off the drawing to the right. Light which travels through light guide 10 to the end of light guide 10 (off the drawing to the left) encounters a terminal reflective mirror (not shown). The terminal mirror reflects light so that it returns through and remains constrained within light guide 10. FIG. 8 illustrates that a light reflecting element 30 located within light guide 10 to reflect light which travels "directly" between the light guide light source and element 30 (i.e., without being reflected back through guide 10 by the terminal mirror—the situation discussed above with reference to FIG. 7) for refractive escape through a selected section of the light guide and at selected angular orientation with respect thereto, will also reflect light which reaches the element "indirectly" (i.e., by being reflected back through guide 10 by the terminal mirror) such that the indirect light reflected by element 30 escapes through the same selected section of the light guide and at the same angular orientation with respect thereto as the direct light reflected by element 30. More particularly, indirect light ray 40 reflected off the terminal mirror encounters element 30 which partially reflects and partially transmits ray 40 along paths 42, 44 respectively. Light traversing path 44 continues along light guide 10 and remains constrained therewithin in accordance with the relationships set forth in the above-mentioned U.S. patent. Reflected light traversing path 42 is refracted through the upper surface of light guide 10 (as viewed in FIG. 8) and is then reflected by reflector 45 back to the upper surface for further refraction therethrough back into light guide 10 along path 46 which can be shown to have a direction vector identical to the direction vector of light reflected by element 30 after traversing a "direct" path from the light guide light source. Accordingly, light traversing path 46 is refracted by the lower wall of light guide 10 and escapes therethrough at an angular orientation with respect to the light guide 10 defined by the relationships set forth above.

Figure 9:
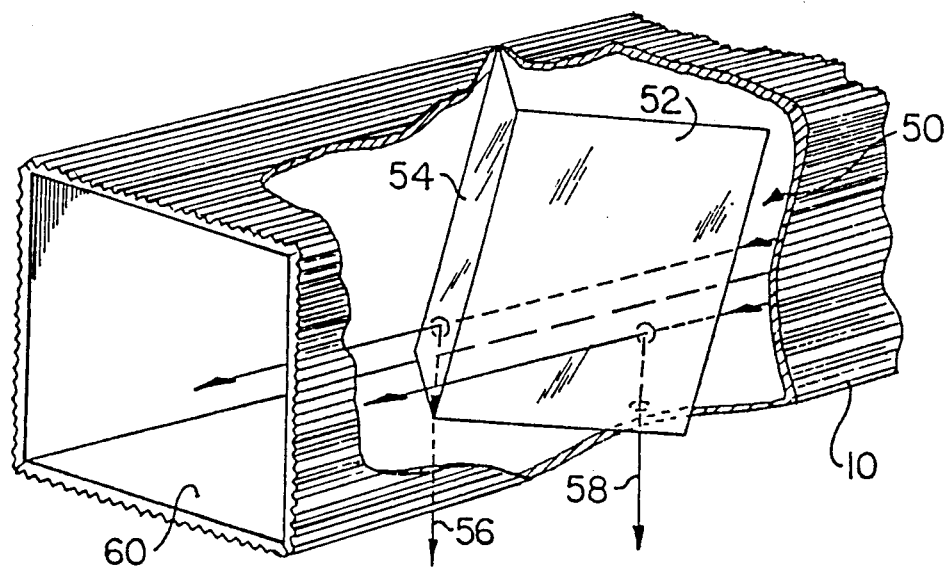
FIG. 9 is a partially fragmented pictorial illustration of a light guide section in which an alternate light reflecting element having first and second light reflecting portions is located to reflect light for refraction through the light guide wall at 90° to the internal surface of the light guide wall.

As explained above there are many values of the angle $\phi_{out}$ for which there are two different solutions for the angle $\phi_{in}$. This fact is exploited in the embodiment of FIG. 9 which shows a partially fragmented section of a light guide 10 within which a light reflecting element 50 is located. Element 50 comprises first and second light reflecting portions 52, 54 respectively. In constructing element 50, portions 52 and 54 are located, relative to one another, such that element 50 may be located within light guide 10 with the angle $\phi_{in}$ for first portion 52 equaling 25.8° and with the angle $\phi_{in}$ for second portion 54 equaling $-25.8°$. The angle $\theta_m$ for the first and second portions remains 135°. Element 50 thus elegantly ensures that light reflected thereby escapes from light guide 10 along paths 56, 58 which have the generally preferred perpendicular orientation to the internal planar surface 60 of light guide 10 through which the light escapes. A significant advantage of element 50 is that it may simply rest within light guide 10 on internal surface 60 and is easily aligned to facilitate the preferred light escapement aforesaid. By contrast, some mounting structure would have to be provided for a single light reflecting element 30 of the type illustrated in FIGS. 4 through 8 and it would be difficult to attain the precise three dimensional orientation of element 30 within light guide 10 required to ensure that light escapes through a selected section of the light guide surface at the preferred angular orientation.

Figure 10:
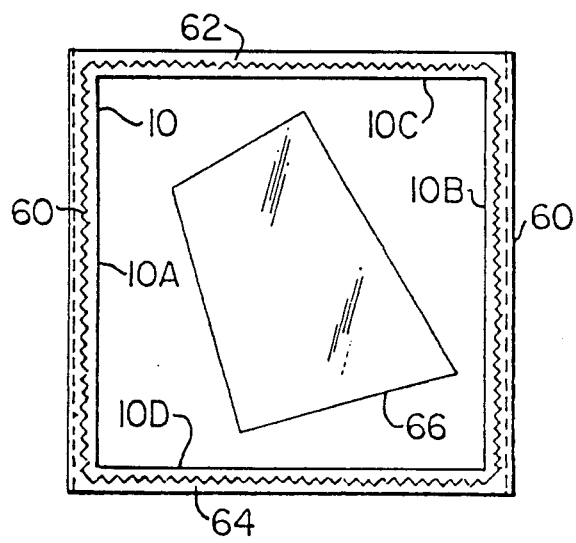
FIG. 10 is an end view of a light guide having a diffuse reflector covering its left and right sides, a specular reflector covering its top side, a transparent filter covering its bottom side and having a light reflecting element located within the guide in accordance with the invention.

In practice it is not possible to produce a light guide having perfectly planar internal surfaces; there will always be some slight imperfections in the internal surfaces. As a result, a small amount of light will in practice escape through each of the internal light guide surfaces, not just through a selected section thereof. FIG. 10 is an end view of a light guide 10 having "imperfectly" planar internal surfaces through each of which some small portion of light traveling within guide 10 will escape. By covering sides 10A and 10B of guide 10 with diffuse reflector material 60, covering side 10C of guide 10 with specular reflector material 62, and covering side 10D with a transparent filter 64, one may ensure that light which escapes through sides 10A, 10B and 10C is reflected back into guide 10 by reflectors 60 and 62 for eventual refraction through side 10D and filter 64 in the generally desired direction of escapement of light from guide 10. Although light reflected by reflectors 60 and 62 may not be refracted through side 10D and filter 64 at the same desired angular orientation as light refracted therethrough after reflection from a light reflecting element 66 located within guide 10 in accordance with the relationships set forth above, the escaping light is at least not completely lost through sides 10A, 10B and 10C but escapes through the desired side of light guide 10; namely side 10D.

A plurality of light reflecting elements may be located at selected regions within a light guide to enable light to escape from the light guide at selected points. However, if those elements are of equal reflectivity then light reflected by the elements farther away from the light guide light source will be dimmer than light reflected by those elements which are located closer to the light guide light source, due to progressive attenuation of the light by the reflecting elements. This may be overcome by ensuring that light reflecting elements located farther away from the light guide light source are progressively more reflective than elements located closer to the light guide light source, thereby equalizing the intensity of light which escapes from the light guide at the site of each reflecting element. This equalization results from the fact that the light reflected by a particular reflecting element for refraction through the wall of the light guide travels not only along "direct" paths between the particular reflecting element and past or through intermediate elements to originate at the light guide light source, but also along "indirect" paths; namely, paths traversed by light transmitted through the light guide and past or through each of the reflecting elements located therewithin, reflected off the terminal mirror at the end of the light guide and returned through the light guide and past or through intermediate elements to the particular element. The desired progressively varied reflectivity may be obtained, for example, by using multi-layered dielectric materials to construct the light reflecting elements or by providing a metallic coating of varying reflectivity on each light reflecting element.

Figure 11:
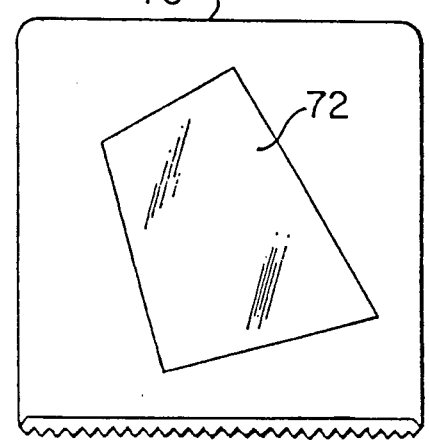
FIG. 11 is an end view of a light guide having opaque, light reflecting material on three sides and prism light guide material on its fourth side and having a light reflecting element located within the guide in accordance with the invention.

FIG. 11 is an end view of a light guide 70 which comprises an opaque, internally light reflective material on three sides and a prismatic light guide material on the fourth side. A light reflecting element 72 may be located within light guide 70 precisely in accordance with the above relationships to reflect light for refraction through a selected section of the light guide material at a desired angular orientation with respect to light guide 70. The structure of FIG. 11 has relatively low light transmission efficiency, due to light absorption by the opaque light reflecting portion, but the structure is relatively cheap and easy to construct and may therefore be desirable in some practical applications.

Figure 12:
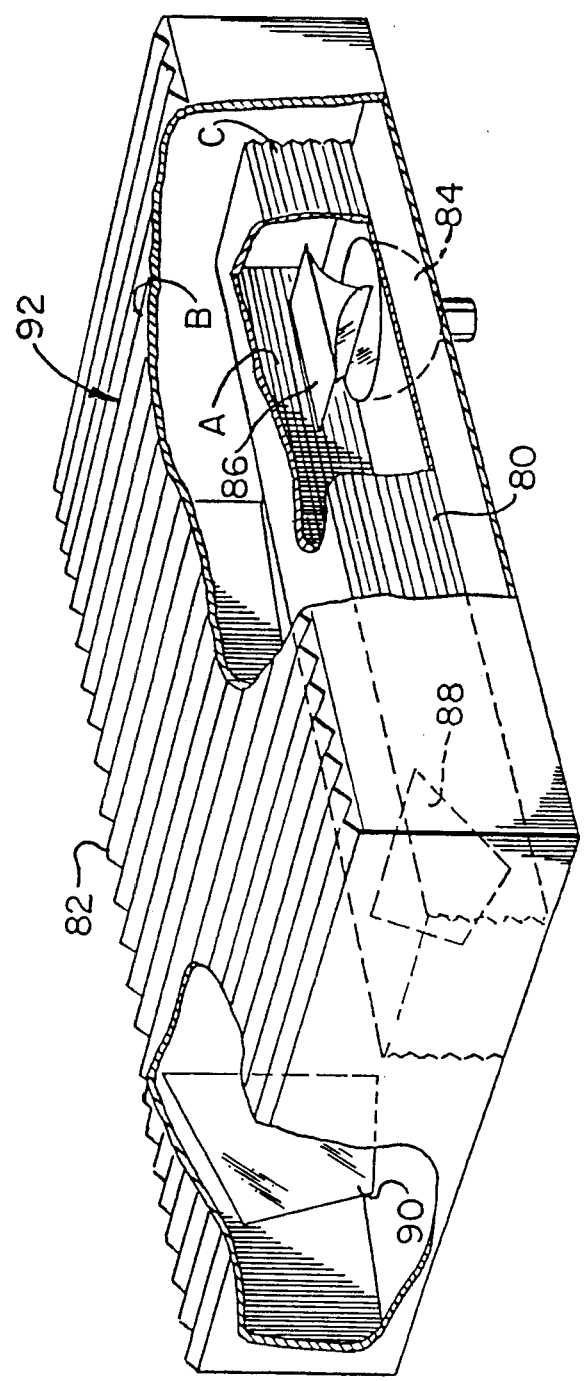
FIG. 12 is a partially fragmented pictorial illustration of a first light guide section positioned within a second light guide section, the first light guide section having a first light reflecting element located within it in accordance with the invention and the second light guide section having a second light reflecting element located within it in accordance with the invention.

FIG. 12 is a partially fragmented pictorial illustration of a "light panel" comprising a first light guide 80 located within a second light guide 82. A light source 84 projects light into first light guide 80. A dual reflector 86 directs the light in both directions along the longitudinal axis of first light guide 80. One or more first light reflecting elements 88 are located within first light guide 80 in accordance with the relationships set forth above to reflect light from within first light guide 80 for refraction through a selected section of first light guide 80 into the region within second light guide 82. One or more second light reflecting elements 90 are optionally located within second light guide 82 in accordance with the relationships set forth above to reflect light for refraction through a selected section of second light guide 82 at a desired angular orientation with respect thereto. It will be understood that the selected section of second light guide 82 through which light is desirably refracted may comprise, for example, the entire surface area 92 of second light guide 82. That is, it may in practice be desirable to configure second light guide 82 as a "light panel" such that light is uniformly emitted through the entire surface area 92, although the light need not necessarily be emitted from second light guide 82 at any particular angular orientation with respect thereto (which is why light reflecting element 90 is optional). Similarly, first light guide 80 may be configured as a "light bar" such that light is uniformly emitted through the entirety of one or more of the surfaces of first light guide 80, for maximal uniform illumination of the interior region of second light guide 82.

It should be noted that only the three surfaces A, B and C of light guides 80, 82 comprising the light panel of FIG. 12 need be formed of prismatic light guide material. The other surfaces of light guides 80, 82 could also be formed of prismatic light guide material, or they could instead be formed of a reflective material. Note further that first light guide 80 may be located anywhere within second light guide 82 and that light source 84 may be located anywhere along any side or at either end of first light guide 80.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A prism light guide having a light reflecting element for reflecting light from a selected region inside said guide for refraction by said guide to a region outside said guide at a selected angular orientation with respect to said guide, the reflected light path inside said guide being characterized by a vector $I_{in}$, the refracted light path outside said guide being characterized by a vector $I_{out}$, said vector $I_{in}$ having angular orientation defined by:
   (a) an angle $\theta_{in}$ measured between said vector $I_{in}$ and the longitudinal axis vector of said guide; and,
   (b) an angle $\phi_{in}$ measured between:
      (i) a plane which contains said vector $I_{in}$ and said longitudinal axis vector; and,
      (ii) a line perpendicular to the selected internal light guide surface through which the light is refracted;
   said vector $I_{out}$ having angular orientation defined by:
   (c) an angle $\theta_{out}$ measured between said vector $I_{out}$ and the longitudinal axis vector of said guide; and,
   (d) an angle $\phi_{out}$ measured between:
      (i) a plane which contains said vector $I_{out}$ and said longitudinal axis vector; and
      (ii) a line perpendicular to the selected internal light guide surface through which the light is refracted;
   wherein said element is located within said guide at an angular orientation defined by:
   (e) an angle $\theta_m$ measured between said longitudinal axis vector and a vector $I_m$ line perpendicular to and directed out of the reflective surface of said element; and,
   (f) an angle $\phi_m$ measured between:
      (i) a plane which contains said vector $I_m$ and said longitudinal axis vector; and,
      (ii) a line perpendicular to the selected internal light guide surface through which the light is refracted;
   such that $\theta_m = (180° + \theta_{out})/2$ $\phi_m = \phi_{in}$;

$\theta_{in} = \theta_{out}$; and, $\phi_{in} = \sin^{-1}(n'\sin((\sin^{-1}(1/n \sin(\phi_{out} \pm 45°))) \mp 45°))$;

where $n' = n(1 - \cos^2\theta_{out}/n^2)(1 - \cos^2\theta_{out}))^{\frac{1}{2}}$;

and n is the refractive index of said light guide material.

2. A light guide as defined in claim 1, wherein:
   n = 1.5;
   $\phi_{in} = \pm 25.8°$; and,
   $\theta_m = 135°$.

3. A light guide as defined in claim 1, wherein said element is a dielectric material.

4. A light guide as defined in claim 1, wherein said element surface area and shape are selected, relative to the internal cross-sectional area of said light guide, and relative to the orientation of said element within said guide, to occupy a selected portion of the internal cross-sectional area of said guide.

5. A light guide as defined in claim 1, wherein n = 1.5 and wherein said element comprises first and second light reflecting portions; said first portion being located within said guide such that $\phi_{in}$ for said first portion is 25.8°, said second portion being located within said guide such that $\phi_{in}$ for said second portion is $-25.8°$; said first and second portions being further located within said guide such that $\theta_m$ for said first and second portions is 135°.

6. A light guide as defined in claim 1, wherein said guide comprises opaque, light reflective material on three sides and prism light guide material on its fourth side.

7. A light guide as defined in claim 1, further comprising a plurality of said light reflecting elements, each one of said elements located at a selected region within said guide to reflect light from said region for refraction by said guide to a region outside said guide at a selected angular orientation with respect to said guide, and wherein the reflectivity of said elements is varied such that elements close to the light guide light source are less reflective than elements which are further away from said light source.

* * * * *